(12) United States Patent
He et al.

(10) Patent No.: US 11,508,251 B2
(45) Date of Patent: Nov. 22, 2022

(54) METHOD AND SYSTEM FOR INTELLIGENT IDENTIFICATION AND CORRECTION OF QUESTIONS

(71) Applicant: HANGZHOU DANA TECHNOLOGY INC., Zhejiang (CN)

(72) Inventors: Tao He, Zhejiang (CN); Huan Luo, Zhejiang (CN); Mingquan Chen, Zhejiang (CN)

(73) Assignee: HANGZHOU DANA TECHNOLOGY INC., Zhejiang (CN)

( * ) Notice: Subject to any disclaimer, the term of this patent is extended or adjusted under 35 U.S.C. 154(b) by 617 days.

(21) Appl. No.: 16/580,254

(22) Filed: Sep. 24, 2019

(65) Prior Publication Data

US 2020/0090539 A1 Mar. 19, 2020

Related U.S. Application Data

(63) Continuation-in-part of application No. PCT/CN2018/122360, filed on Dec. 20, 2018.

(30) Foreign Application Priority Data

Aug. 13, 2018 (CN) .......................... 201810916955.X

(51) Int. Cl.
*G09B 7/02* (2006.01)
*G06N 3/08* (2006.01)

(52) U.S. Cl.
CPC ........ *G09B 7/02* (2013.01); *G06N 3/08* (2013.01)

(58) Field of Classification Search
CPC ............ G09B 7/02; G06N 3/0454; G06N 3/08
See application file for complete search history.

(56) References Cited

U.S. PATENT DOCUMENTS

| 10,699,215 | B2 * | 6/2020 | Devarakonda | G06N 5/022 |
| 2008/0227075 | A1 * | 9/2008 | Poor | G09B 7/06 434/307 R |

(Continued)

FOREIGN PATENT DOCUMENTS

| CN | 101866415 A | 10/2010 |
| CN | 103927552 A | 7/2014 |

(Continued)

OTHER PUBLICATIONS

"Character Recognition System Based on Image Processing", "Chinas Outstanding Masters Thesis Full-text Database Information Collection", Qian Yao, No. 06, 2007, pp. 1138-1697.

(Continued)

*Primary Examiner* — Eddy Saint-Vil
(74) *Attorney, Agent, or Firm* — KDB Firm PLLC

(57) ABSTRACT

A method and a system for intelligent identification and correction of a question, which implements, through artificial intelligence, automatic identification of stems of various types of questions and contents of answering in test papers and auto-corrects the contents of answering. The technical solution is: to train a neural network model (e.g., CNN model) into a model for question type recognition based on numerous test paper samples in advance, and to use this trained model to detect the position of individual questions, the type corresponding to the question, the different components of the question (stem, answer, picture) in the test paper, and then to identify the printed font character information of the stem and the handwriting font character information of the answer part based on the recognition model, and finally to auto-correct based on the identified character information.

14 Claims, 10 Drawing Sheets

(56) References Cited

U.S. PATENT DOCUMENTS

| | | | |
|---|---|---|---|
| 2015/0161903 A1* | 6/2015 | Colliander | G09B 7/02 |
| | | | 434/350 |
| 2015/0187219 A1 | 7/2015 | Sheppard | |
| 2018/0137433 A1* | 5/2018 | Devarakonda | G06N 5/022 |
| 2020/0330028 A1* | 10/2020 | Nejati | G06N 3/0454 |

FOREIGN PATENT DOCUMENTS

| | | | |
|---|---|---|---|
| CN | 104268603 | A | 1/2015 |
| CN | 104715253 | A | 6/2015 |
| CN | 104915667 | A | 9/2015 |
| CN | 105427696 | A | 3/2016 |
| CN | 107590494 | A | 1/2018 |
| CN | 107909067 | A | 4/2018 |
| CN | 108053348 | A | 5/2018 |
| CN | 108171297 | A | 6/2018 |
| CN | 108932508 | A | 12/2018 |

OTHER PUBLICATIONS

Li Hongfeng, "Understanding of Exam Paper Layout Based on OCR", Full-text Database of Chinas Excellent Masters Degree Thesis, Information Technology Series, Feb. 15, 2013 (Feb. 15, 2013) No. 02, ISSN: 1674-0246.

International Search Report and Written Opinion for the International Patent Application No. PCT/CN2018/122360, dated May 16, 2019, 4 pages.

Wang et al., "Handwriting recognition in test paper recognition" Electronic World, vol. 21, Nov. 30, 2016.

* cited by examiner

Mathematical test paper

Fill in the blanks

...... the area of the triangle is __.

......

Calculation questions

7÷ (31-22) =

......

Choice questions

......, the correct one is: ( )

A 10  B 15  C 20  D 25

......

Application questions

......, how long it takes for water in the sink be drained?

Figure 11

4. Xiao Ming walks for 3 minutes just to half of the whole journey, how many meters is his home from school? (6 points)

65×3=195 (meters)
195×2=390 (meters)

METHOD AND SYSTEM FOR INTELLIGENT IDENTIFICATION AND CORRECTION OF QUESTIONS

CROSS-REFERENCE TO RELATED APPLICATIONS

This is a continuation-in-part of pending international application serial number PCT/CN2018/122360, filed Dec. 20, 2018, which claims priority to Chinese national patent application 201810916955.X, filed Aug. 13, 2018, the entirety of which applications are incorporated by reference herein.

TECHNICAL FIELD

The present invention relates to artificial intelligence technology, and more particularly, to technology for auto-correcting an answer sheet containing multiple types of questions.

BACKGROUND

With the continuous advancement of computer technology and educational informatization, computer technology has been gradually applied to daily educational and teaching activities, for example, has been applied in the teaching evaluation scenario. The main form of investigation of the existing basic education and student learning status in domestic is still various types of examinations or tests, under this circumstance, teachers are burdened with great pressures for correcting assignments and examination papers. In response to this phenomenon, various types of automatic marking systems have been gradually promoted and adopted in large and medium-sized or high important examinations or tests. Such systems can alleviate the workload of teachers' readings to some extent.

In the existing automatic marking system, the part that is completely completed by a computer is mostly the marking of the objective questions (such as choice questions), and the adopted processing method is to read the data of the filling card and compare it with the standard answer. Although this method effectively improves the speed of review, it requires students to answer for objective questions with 2B pencils. It is not only inconvenient, but also prone to misapplication, missing application and/or the like. In addition, the printed test papers for students manually answering, when being corrected, are heavily rely on the manual inspection and correction by teachers or parents, especially questions such as fill-in-the-blank type questions or subjective type questions. The location and specific content of the answers cannot be effectively passed through existing marking systems for automatic identification, or with poor identification effect and inefficient. Moreover, when manual marking, unfair and injustice judgment results may occur due to subjective factors, such as different teacher styles, emotions, and mental states etc.

As Internet technologies and products gradually penetrate into the education field, the size of online education audiences continues to expand, further increasing the amount of exams and assignments reviews. Therefore, how to reduce the workload of manual review as well as to improve the accuracy and objectivity of the review, especially the scoring, is an urgent problem to be solved in the industry.

SUMMARY

A brief overview of one or more aspects is present below to provide a basic understanding of these aspects. This summary is not an extensive overview of all aspects that are conceived, and is neither intended to identify key or critical elements in all aspects, nor to define the scope of any or all aspects. Its sole purpose is to present some concepts of one or more aspects in a simplified form, as a preface of the more detailed description given later.

An object of the present invention is to address above issues, and to provide methods and systems for intelligent identification and correction of questions, which implements, through artificial intelligence, automatically identification of stems of various types of questions and contents of answering in test papers and auto-corrects the contents of answering.

The technical solution of the present invention is as follows: the present invention discloses a method for intelligent identification of a question, comprising:

Step 1: identify regions of individual questions on a test paper based on an image of the test paper and a first model trained in advance, wherein the first model is a neural network based model;

Step 2: identify the question type for regions of the individual questions respectively by using the first model, and label the identified individual types of questions respectively, and label individual components of the corresponding type of the question in the region of individual questions, the components including stems, answers, and/or pictures;

Step 3: identify the characters in the region of the individual questions based on the separate images of the regions of the individual questions on the test paper, the type of the question corresponding to the region of the question, the component corresponding to the region of the question, and a second model, so as to determine the information recorded on the test paper, wherein the second model is a neural network based model.

According to one embodiment of the method for intelligent identification for the questions of the present invention, the second model in Step 3 includes a recognition model for a stem and an recognition model for an answer, wherein the stem is composed of a printed font, and the answer is composed of a handwriting font, the recognition model for the stem and the recognition model for the answer are each independently trained.

According to one embodiment of the method for intelligent identification for the questions of present invention, the first model is obtained from training by following steps:

labeling each test paper image sample in a first training set of test paper image samples to label each of one or more regions in each of the test paper image samples, a type of the question corresponding to each region, components included in the type of the question corresponding to each region, the components including a stem, a answer, and/or a picture; and training a first neural network, through the first training set of the test paper image samples processed by the labeling, to obtain the first model.

According to one embodiment of the method for intelligent identification for the questions of the present invention, the second model is obtained from training by following steps:

performing labeling processing on each test paper image sample in a second training set of test paper image samples to label each of one or more regions in each of the test paper image samples and characters in each region, and;

training a second neural network, through the second training set of the test paper image samples processed by the labeling, to obtain the second model.

According to one embodiment of the method for intelligent identification for the questions of the present invention, the first neural network is built based on a deep convolutional neural network.

According to one embodiment of the method for intelligent identification for the questions of the present invention, the second neural network is built based on a dilated convolution and attention model.

According to one embodiment of the method for intelligent identification for the questions of the present invention, the Step 1 further comprises:

extracting a two-dimensional feature vector from the image of the test paper by using the first model;

generating anchors of different shape in each mesh of the two-dimensional feature vector, and labeling the identified regions using groundtruth boxes.

According to one embodiment of the method for intelligent identification for the questions of the present invention, after the process of labeling the identified regions using the groundtruth boxes in Step 1, the method further comprises:

performing regression process on the groundtruth boxes and the generated anchors, so that the groundtruth box is close to the actual position of the question.

According to one embodiment of the method for intelligent identification for the questions of the present invention, Step 3 further comprises:

performing feature extraction on the groundtruth box corresponding to the stem, the answer and/or the picture type respectively by employing the dilated convolution;

decoding the extracted features into characters by using the attention model.

According to one embodiment of the method for intelligent identification for the questions of present invention, training on the neural network further comprises:

testing the accuracy of the trained neural network based on the test set of the test paper image samples;

if the output accuracy is less than a predetermined threshold, increasing the number of test paper image samples in the training set of the test paper image samples, and each of the test paper image samples in the increased test paper image samples is subjected to the labeling process; and re-training the neural network by using the training set of test paper image samples that has increased the number of test paper image samples.

The invention also discloses a method for intelligent correction of a question, comprising:

a method for intelligent identification of a question according to the foregoing described above; and searching in a question bank based on a decoded stem, if there is a search result, a labeled type of the question corresponding to the search result is obtained, and each question is cut and corrected separately.

According to one embodiment of the method for intelligent correction of a question of the present invention, the way to correct for different type of questions comprises:

if the question type is a calculation type question, the result is calculated by a calculation engine and comparison is performed;

if the question type is a choice or fill-in-the-blank or true or false type question, it is directly decided whether the input answer is consistent with the labeled answer;

if the question type is subjective type question, the standard answer is shown directly.

According to one embodiment of the method for intelligent correction of a question of the present invention, for the correction of the calculation type question, for the calculation type question with multiple calculation steps, the answer process of different lines is cut and judged whether the calculation is correct according to the content of up and down lines by the calculation engine.

According to one embodiment of the method for intelligent correction of a question of the present invention, for the correction of the calculation type question, questions with the filling of calculation symbols, more-than sign and less-than sign, and the unit conversion are identified as the calculation type question, and the correction is done by the calculation engine to judge the content of both sides.

The invention discloses a system for intelligent identification of a question, comprising:

a first model, the first model being a neural network based model;

a second model, the second model being a neural network based model;

a first apparatus configured to:

identify regions of individual questions on a test paper based on an image of the test paper and the first model trained in advance;

identify the question type for regions of the individual questions respectively by using the first model, and label the identified individual types of questions respectively, and label individual components of the corresponding type of the question in the region of individual questions, the components including stems, answers, and/or pictures;

identify the characters in each of the one or more regions based on the separate images of the regions of the individual questions on the test paper, the type of the question corresponding to the region of the question, the component corresponding to the region of the question, and the second model, so as to determine the information recorded on the test paper.

According to one embodiment of the system for intelligent identification for the questions of the present invention, the second model includes a recognition model for a stem and an recognition model for an answer, wherein the stem is composed of a printed font, and the answer is composed of a handwriting font, the recognition model for the stem and the recognition model for the answer are each independently trained.

According to one embodiment of the system for intelligent identification for the questions of present invention, the first model is trained based on a deep convolutional neural network, and the second model is trained based on a dilated convolution and attention model.

The invention also discloses a system for intelligent correction of a question, comprising:

a system for intelligent identification of a question according to the foregoing described above;

a second apparatus, the second apparatus being configured to:

search in a question bank based on a decoded stem, if there is a search result, a labeled type of the question corresponding to the search result is obtained, and each question is cut and corrected separately.

According to one embodiment of the system for intelligent correction of a question of the present invention, the second apparatus performs correction for different types of questions:

if the question type is a calculation type question, the result is calculated by a calculation engine and comparison is performed;

if the question type is a choice or fill-in-the-blank or true or false type question, it is directly decided whether the input answer is consistent with the labeled answer;

if the question type is subjective type question, the standard answer is shown directly.

The invention also discloses a system for intelligent identification of a question, comprising:
a processor; and
a memory configured to store a series of computer executable instructions and computer accessible data associated with the series of computer executable instructions,
wherein, when the series of computer executable instructions are executed by the processor, cause the processor to perform the method as described above.

The present invention discloses a non-transitory computer readable storage medium, characterized in that, the non-transitory computer readable storage medium having a series of computer executable instructions stored thereon, which when executed by a computer apparatus, cause the computing apparatus to perform the method as described above.

The invention discloses a system for intelligent correction of a question, comprising:
a processor;
a memory configured to store a series of computer executable instructions and computer accessible data associated with the series of computer executable instructions,
wherein, when the series of computer executable instructions are executed by the processor, cause the processor to perform the method as described above.

The present invention also provides a non-transitory computer readable storage medium having stored thereon a series of computer executable instructions, which when executed by a computing apparatus, cause the computing apparatus performs the method as described above.

Compared with the prior art, the present invention has the following beneficial effects: the present invention trains a neural network model (e.g., CNN model) into a model for question type recognition based on numerous test paper samples in advance, and uses this trained model to detect the position of individual questions, the type corresponding to the question, the different components of the question (stem, answer, picture) in the test paper, and then identifies the printed font character information of the stem and the handwriting font character information of the answer part based on the recognition model, and finally auto-corrects based on the identified character information, and at the same time, may analyze and correct question solving steps, as well as mark error places and make resolution. Compared with the prior art, the present invention can automatically identify and correct test papers containing various types of questions, and is not limited to a single question type (for example, only limited to oral arithmetic type questions), thereby expanding the application range and improving the efficiency of assignments correction.

Another object of the present invention is to provide methods, apparatus, electronic device and computer readable storage medium for searching and correction of questions, seeking to solve the problem of lack of efficiency and the error prone manner in existing question searching.

To achieve the above object, the present invention provides a method for searching questions, comprising:
Step 11: detecting an image of a test paper to be searched, with regions of each question to be searched on the test paper to be searched being detected, and identifying text content of a stem in the region of each question to be searched;
Step 12: inputting the text content of the stem of each question to be searched into a pre-trained stem vectorization model, with a feature vector of the stem of each question to be searched being obtained, as the feature vector of each question to be searched, wherein the stem vectorization model is a neural network based model;
Step 13: for each question to be searched, searching in a question bank for a feature vector matching with the feature vector of the question to be searched, and determining a question corresponding to the matching feature vector in the question bank as a question closest to the question to be searched;
Step 14: summarizing and finding test papers where the questions closest to all the questions to be searched are in, with a test paper meeting a preset condition being determined as a target test paper matching with the test paper to be searched, and conducting searching for the questions to be searched on the test paper to be searched by the target test paper.

Optionally, the stem vectorization model is trained by the following steps:
performing on each question sample in a first training set of question samples labeling process, with text content of the stem in each question sample being labeled;
extracting a two-dimensional feature vector from the text content of the stem in each question sample by using a neural network model, thus obtaining the stem vectorization model by training.

Optionally, if the question to be searched in the test paper to be searched includes a picture, the method further comprises:
Step 15: after detecting the region of each question to be searched on the test paper to be searched in Step 11, inputting the picture in the question to be searched containing the picture into a pre-trained picture vectorization model to obtain a feature vector of the picture of the question to be searched containing the picture, wherein the picture vectorization model is a neural network based model;
Step 16: after obtaining the feature vector of the stem of each question to be searched in Step 12, for the question to be searched containing no pictures, directly using the feature vector of the stem of the question to be searched as the feature vector of the question to be searched, and for the question to be searched containing pictures, splicing the feature vector of the picture of the question to be searched with the feature vector of the stem as the feature vector of the question to be searched.

Optionally, the picture vectorization model is trained by the following steps:
performing on each question sample in a second training set of question samples labeling process, with the picture in each question sample being labeled;
extracting two-dimensional feature vector from the picture in each question sample by using a neural network model, thus obtaining the picture vectorization model by training.

Optionally, an index information table is established in advance for the feature vectors of each question on the test papers in a question bank;
Step 13 further comprises:
for each question to be searched, searching in the index information table a feature vector matching with the feature vector of the question to be searched;
determining a question corresponding to the matching feature vector in the index information table as a question closest to the question to be searched.

Optionally, before the index information table is established, grouping feature vectors of different lengths by length;

for each question to be searched, said searching in the index information table the feature vector matching with the feature vector of the question to be searched comprises:

for each question to be searched, within a group of the index information table that has a same or similar length as the feature vector of the question to be searched, searching for a feature vector matching with the feature vector of the question to be searched.

Optionally, said determining the test paper meeting the preset conditions as the target test paper matching with the test paper to be searched comprises:

determining a test paper that occurs with a frequency equal to or above a first preset threshold as the target test paper matching with the test paper to be searched.

Optionally, conducting search for the questions to be searched on the test paper to be searched by the target test paper comprises:

when a question closest to a certain question to be searched in the test paper to be searched belongs to the target test paper, determining the question closest to the certain question to be searched as search result of the certain question to be searched;

when a question closest to a certain question to be searched in the test paper to be searched does not belong to the target test paper, matching the feature vector of the certain question to be searched with the feature vector of each question in the target test paper by a minimum edit distance, finding a question with a minimum edit distance that is smallest in the target test paper as the target question, and if the minimum edit distance that is smallest is less than a second preset threshold, correcting the search result of the certain question to be searched as the target question.

Optionally, said detecting the image of the test paper to be searched, with regions of each question to be searched on the test paper to be searched being detected comprises:

detecting the image of the test paper to be searched by using a pre-trained detection model, with regions of each question to be searched on the test paper to be searched being detected, wherein the detection model is a neural network-based model.

Optionally, said identifying text content of the stem in the region of each question to be searched comprises:

identifying the text content of the stem in the region of each question to be searched by using a pre-trained recognition model, wherein the recognition model is a neural network based model.

In order to achieve the above object, the present invention further provides a method for intelligent correction of questions, comprising:

S91: searching for a test paper to be corrected by using any of above methods for searching questions, with a target test paper in the question bank matching with the test paper to be corrected being searched;

S92: for each question to be corrected in the test paper to be corrected, correcting the question to be corrected according to the answer to the question on the target test paper matching with the question to be corrected.

In order to achieve the above object, the present invention further provides an apparatus for searching questions, comprising:

a detection and identification module, configured to detect an image of a test paper to be searched, with regions of each question to be searched on the test paper to be searched being detected, and identify text content of a stem in the region of each question to be searched;

a first obtaining module, configured to input the text content of the stem of each question to be searched into a pre-trained stem vectorization model, with a feature vector of the stem of each question to be searched being obtained, as the feature vector of each question to be searched, wherein the stem vectorization model is a neural network based model;

a searching module, configured to, for each question to be searched, search in a question bank for a feature vector matching with the feature vector of the question to be searched, and determine a question corresponding to the matching feature vector in the question bank as a question closest to the question to be searched;

a determination module, configured to summarize and find test papers where the questions closest to all the questions to be searched are in, with a test paper meeting a preset condition being determined as a target test paper matching with the test paper to be searched, and conduct searching for the questions to be searched on the test paper to be searched by the target test paper.

Optionally, the apparatus further comprises:

a first training module, configured to obtain the stem vectorization model by training: performing on each question sample in a first training set of question samples labeling process, with text content of the stem in each question sample being labeled; extracting a two-dimensional feature vector from the text content of the stem in each question sample by using a neural network model, thus obtaining the stem vectorization model by training.

Optionally, if the question to be searched in the test paper to be searched includes a picture, the apparatus further comprises:

a second obtaining module, configured to, after detecting the region of each question to be searched on the test paper to be searched in the detection and identification module, input the picture in the question to be searched containing the picture into a pre-trained picture vectorization model to obtain a feature vector of the picture of the question to be searched containing the picture, wherein the picture vectorization model is a neural network based model;

a third obtaining module, configured to, for the question to be searched containing no pictures, directly use the feature vector of the stem of the question to be searched as the feature vector of the question to be searched, and for the question to be searched containing pictures, splicing the feature vector of the picture of the question to be searched with the feature vector of the stem as the feature vector of the question to be searched.

Optionally, the apparatus further comprises:

a second training module, configured to obtain the image vectorization model by training: performing on each question sample in a second training set of question samples labeling process, with the picture in each question sample being labeled; extracting two-dimensional feature vector from the picture in each question sample by using a neural network model, thus obtaining the picture vectorization model by training.

Optionally, the apparatus further comprises:

a pre-processing module, configured to establish an index information table in advance for the feature vectors of each question on the test papers in a question bank;

the searching module, specifically configured to, for each question to be searched, search in the index information table a feature vector matching with the feature vector of the question to be searched; determine a question corresponding to the matching feature vector in the index information table as a question closest to the question to be searched.

Optionally, the pre-processing module is further configured to group feature vectors of different lengths by length before the index information table is established;

The searching module is specifically configured to, for each question to be searched, within a group of the index information table that has a same or similar length as the feature vector of the question to be searched, search for a feature vector matching with the feature vector of the question to be searched.

Optionally, the determination module is specifically configured to determine a test paper that occurs with a frequency equal to or above a first preset threshold as the target test paper matching with the test paper to be searched.

Optionally, the determination module is specifically configured to: when a question closest to a certain question to be searched in the test paper to be searched belongs to the target test paper, determine the question closest to the certain question to be searched as search result of the certain question to be searched; when a question closest to a certain question to be searched in the test paper to be searched does not belong to the target test paper, match the feature vector of the certain question to be searched with the feature vector of each question in the target test paper by a minimum edit distance, finding a question with a minimum edit distance that is smallest in the target test paper as the target question, and if the minimum edit distance that is smallest is less than a second preset threshold, correct the search result of the certain question to be searched as the target question.

Optionally, the detection and identification module is specifically configured to detect the image of the test paper to be searched by using a pre-trained detection model, with regions of each question to be searched on the test paper to be searched being detected, wherein the detection model is a neural network-based model.

Optionally, the detection and identification module is specifically configured to identify the text content of the stem in the region of each question to be searched by using a pre-trained recognition model, wherein the recognition model is a neural network based model.

In order to achieve the above object, the present invention further provides an apparatus for intelligent correction of test papers, comprising any of the above apparatus for search of questions and a module for correction, wherein:

the apparatus for search of questions is configured to search for a test paper to be corrected, with a target test paper in the question bank matching with the test paper to be corrected being searched;

the correction module is configured to, for each question to be corrected in the test paper to be corrected, correct the question to be corrected according to the answer to the question on the target test paper matching with the question to be corrected.

In order to achieve the above object, the present invention further provides an electronic device comprising a processor, a communication interface, a memory and a communication bus, wherein the processor, the communication interface and the memory communicate with each other through the communication bus;

the memory is configured to store a computer program;

the processor is configured to, when the program stored on the memory is executed, implement steps of any of the above methods for search of questions.

In order to achieve the above object, the present invention further provides an electronic device comprising a processor, a communication interface, a memory and a communication bus, wherein the processor, the communication interface and the memory communicate with each other through the communication bus;

the memory is configured to store a computer program;

the processor is configured to, when the program stored on the memory is executed, implement steps of any of the above methods for intelligent correction of questions.

In order to achieve the above object, the present invention further provides a computer readable storage medium, wherein the computer readable storage medium stores therein a computer program, which when executed by a processor, implements steps of any of the above methods for search of questions.

In order to achieve the above object, the present invention further provides a computer readable storage medium, wherein the computer readable storage medium stores therein a computer program, which when executed by a processor, implements steps of any of the above methods for intelligent correction of questions.

Compared with the prior art, the present invention pre-trains a neural network model into a stem vectorization model for extracting the feature vector of the stem based on a plurality of question samples; after regions of respective questions to be searched on the image of the test paper to be searched are detected, and the text contents of the stems in regions of respective questions to be searched are identified, inputs the text content of each question into the pre-trained stem vectorization model, obtaining the feature vector of the stem of each question to be searched as the feature vector of each question to be searched; searches in the question bank based on the feature vector of the question to be searched, and finds a question closest to the question to be searched, then the target test paper matching with the test paper to be searched is determined by summarizing the test papers where the questions to be searched are in; and completes search for the question to be searched on the test paper to be searched by the target test paper. It can be seen that, compared with searching directly by using the text content of the stem in the question bank in the prior art, by extracting the feature vector of the stem based on the stem vectorization model in the present invention, the text content of the stem is found in the question bank in the form of the feature vector. This finding is more efficient, and less likely to make mistakes. The corresponding question can be found even if some texts are different, offering better compatibility of finding similar questions, thereby improving the accuracy of the search. Furthermore, the method for intelligent correction of test papers in the present invention provides higher efficiency and accuracy of correction.

DRAWINGS

The above features and advantages of the present invention will be better understood upon the detailed description of embodiments of the present disclosure is read in conjunction with the following accompanying drawings. In the drawings, components are not necessarily drawn to scale, and components having similar related characteristic or features may have the same or similar reference numerals.

FIG. 11 shows one example of the contents of a test paper of the present invention.

DETAILED DESCRIPTION

The invention is described in detail below with reference to the drawings and specific embodiments. It is to be noted that the aspects described below in conjunction with the drawings and the specific embodiments are merely exemplary and are not to be construed as limiting the scope of the invention.

Figure 1:
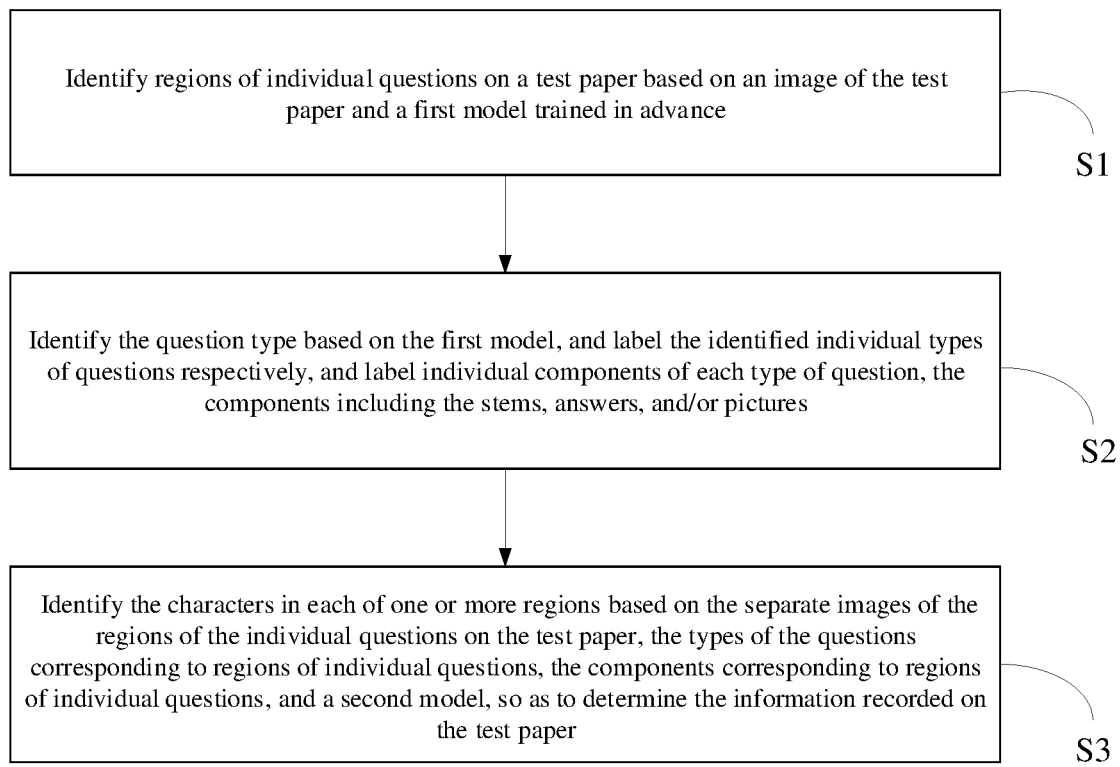
FIG. 1 shows a flow chart of one embodiment of a method for intelligent identification of a question of the present invention.

FIG. 1 shows a flow chart of one embodiment of a method for intelligent identification of a question of the present invention. Referring to FIG. 1, the following is a detailed description of each step of the method for intelligent identification of a question in the present embodiment.

Step S1: identifying regions of individual questions on a test paper based on an image of the test paper and a first model trained in advance, the first model being a neural network based model.

Figure 3:
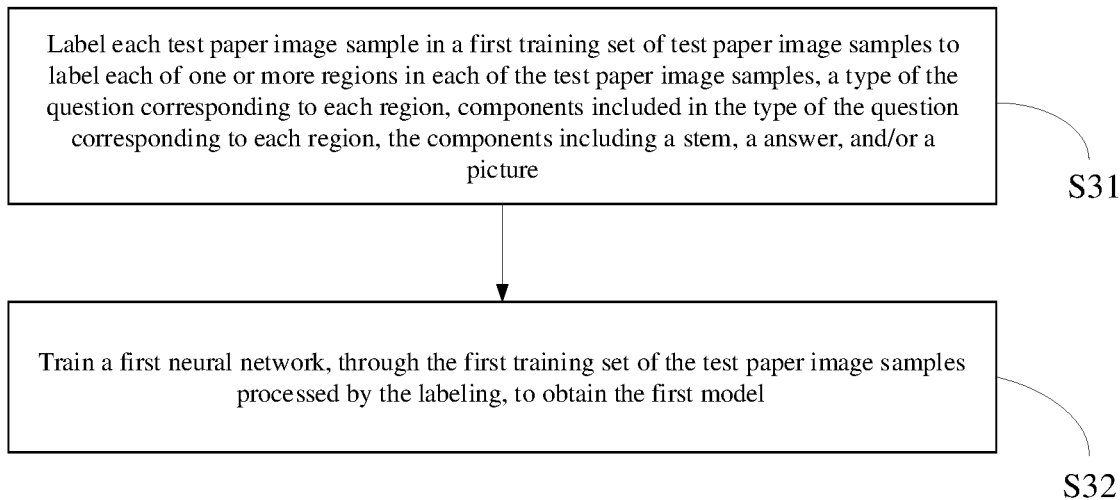
FIG. 3 shows a flow chart of the training process for a first model of the present invention.

The first model was trained by the steps shown in FIG. 3. Also refer to FIG. 3, the process of how to train and get the first model is described below in detail.

Step S31: labeling each test paper image sample in a first training set of test paper image samples to label each of one or more regions in each of the test paper image samples, a type of the question corresponding to each region, components included in the type of the question corresponding to each region, the components including a stem, an answer, and/or a picture.

In the embodiment, the first training set of test paper image samples is test paper picture samples labeled with corresponding question type and location, and the number of pictures of each category may be the same or different.

Step S32: training a first neural network, through the first training set of the test paper image samples processed by the labeling, to obtain the first model.

In the embodiment, the first neural network is built based on a deep convolutional neural network (CNN network). In addition to this, it is also possible to use, for example, a ResNet model for training.

Figure 8:
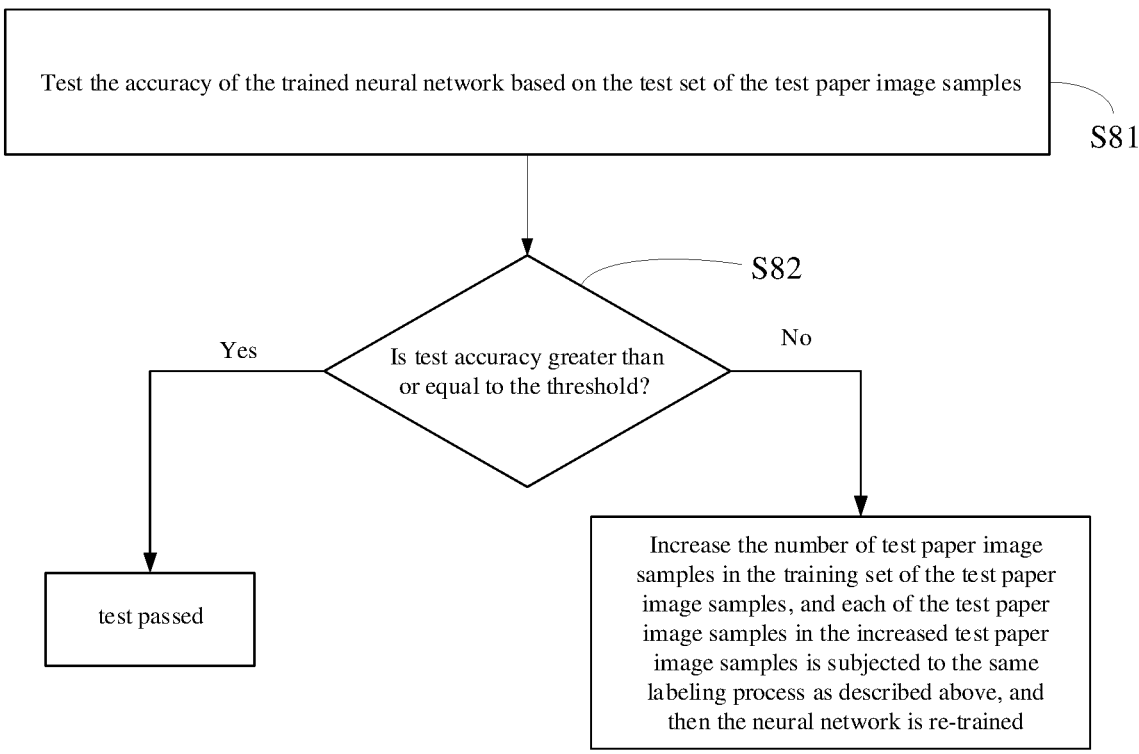
FIG. 8 shows a refined flow chart of the test of the accuracy of the model in the neural network training of the present invention.

Preferably, an accuracy test for the neural network training process shown above in FIG. 3 is added thereof to further improve the model recognition effect. The test process is shown in FIG. 8.

Step S81: testing the accuracy of the trained neural network based on the test set of the test paper image samples.

Step S82: determining the magnitude relationship between the accuracy output from the test and a predetermined threshold. If the test accuracy is greater than or equal to the threshold, indicating the test passes, and if it is less than the threshold, then proceeds to step S83.

Step S83: increasing the number of test paper image samples in the training set of the test paper image samples, and each of the test paper image samples in the increased test paper image samples is subjected to the same labeling process as described above, and then the neural network is re-trained as shown in FIG. 3.

Figure 5:
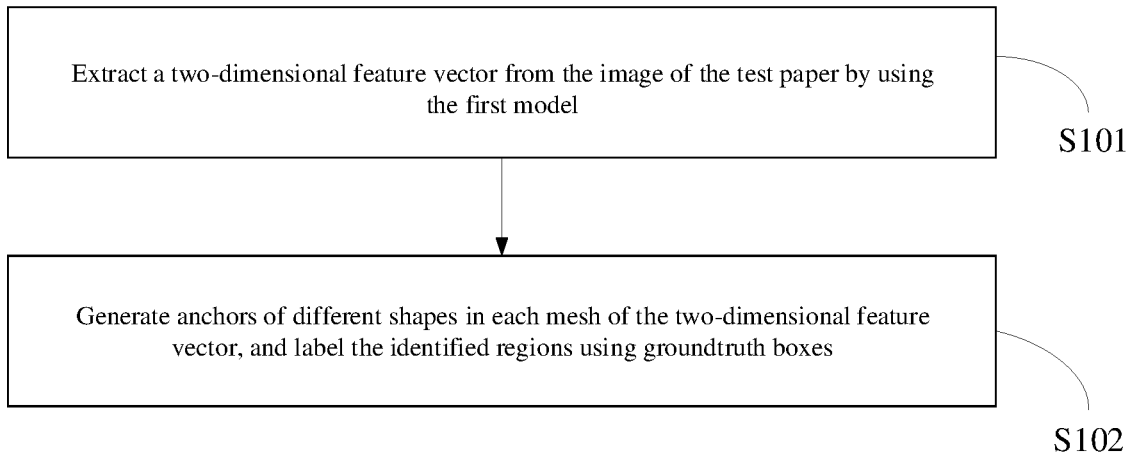
FIG. 5 shows a refined flow chart of one example of Step 1 in the intelligent identification of the present invention.
Figure 6:
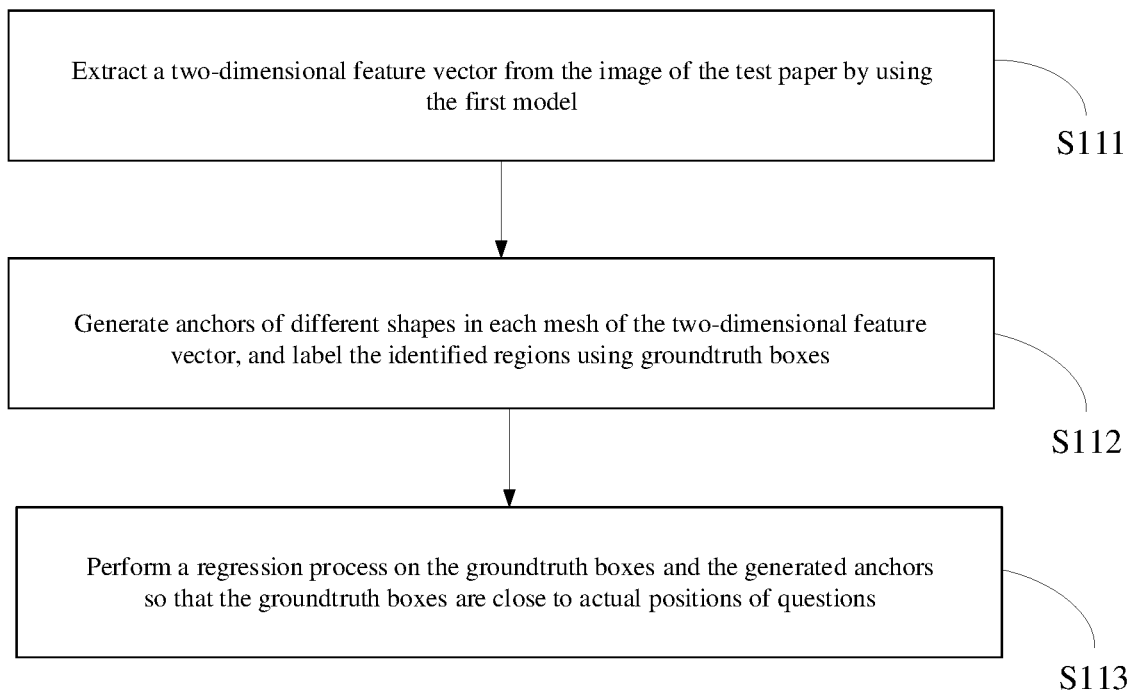
FIG. 6 shows a refined flow diagram of another example of Step 1 in the intelligent identification of the present invention.

The specific implementation of step S1 may have two ways: a refined step as shown in FIG. 5 or a refined step as shown in FIG. 6, and these two implementations are described respectively below.

Referring to FIG. 5, one of the refined processes of step S1 is as follows.

Step S101: extracting a two-dimensional feature vector from the image of the test paper by using the first model.

Step S102: generating anchors of different shape in each mesh of the two-dimensional feature vector, and labeling the identified regions using groundtruth boxes.

The anchor is specifically the center coordinate of the groundtruth box and the length and height of the groundtruth box. Since text lines in test papers are mostly with long strips, the anchors generated in this embodiment have a rectangular frame mainly with frame height ratio of 2:1, 3:1, 4:1, and different questions have different shapes of groundtruth box.

Different from the processing shown in FIG. 5, the present invention also adds a step to make the region identification more accurate. Referring to FIG. 6, another refined process of step S1 is as follows.

Step S111: extracting a two-dimensional feature vector from the image of the test paper by using the first model.

Step S112: generating anchors of different shape in each mesh of the two-dimensional feature vector, and labeling the identified regions using groundtruth boxes.

Wherein, the mesh is a two-dimensional characteristic matrix of different channels after convolution, and the generated anchors are actually groundtruth box processing on the identified regions in a single channel. At this point, only to find out all possible regions, but the type has not yet been distinguished. Features at this time are for the entire picture, and it has not yet distinguished between the components such as stems, answers, and pictures.

Step S113: performing a regression process on the groundtruth boxes and the generated anchors so that the groundtruth boxes are close to actual positions of questions.

Step S2: identifying the question type based on the first model, and labeling the identified individual types of questions respectively, and labeling individual components of each type of question, the components including the stems, answers, and/or pictures.

In this embodiment, different types are position groundtruth boxed (that is, each type of question is recognized), and the stem part, the answer part and the picture part in each type of question are labeled, and then the different groundtruth boxes are cut out and classified separately and labeled the type to which the question belongs.

Step S3: identifying the characters in each of the one or more regions based on the separate images of the regions of the individual questions on the test paper, the types of the questions corresponding to regions of individual questions, the components corresponding to regions of individual questions, and a second model, so as to determine the information recorded on the test paper, wherein the second model is a neural network based model.

The second model can be the same model, or it can include two models: a recognition model for the stem and a recognition model for the answer. Because the stems are generally composed of printed fonts, and the answers are generally composed of handwriting fonts, so the recognition model for the stem and the recognition model for the answer are independently trained.

Figure 4:
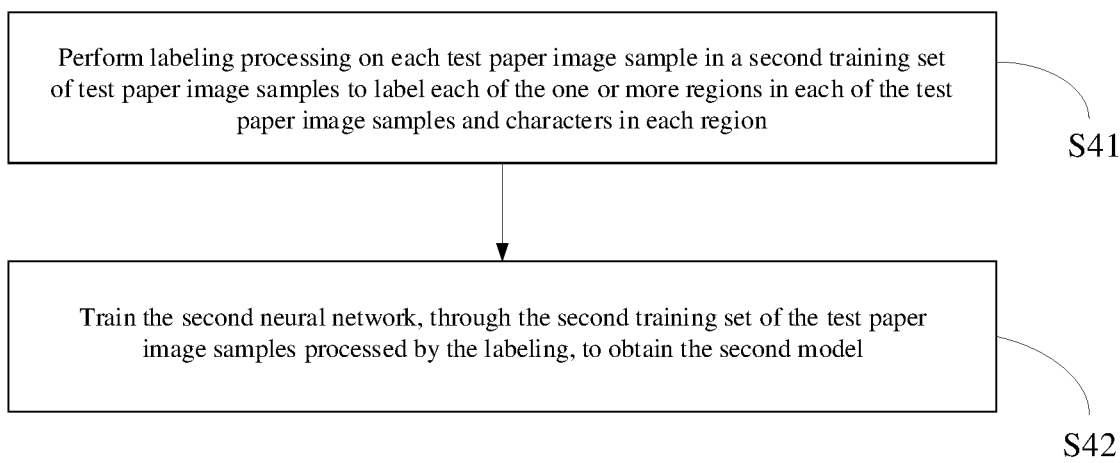
FIG. 4 shows a flow chart of the training process for a second model of the present invention.

The second model is trained by the flow shown in FIG. 4. Referring to FIG. 4, the following is the training process of the second model.

Step S41: performing labeling processing on each test paper image sample in a second training set of test paper image samples to label each of the one or more regions in each of the test paper image samples and characters in each region.

Step S42: training the second neural network, through the second training set of the test paper image sample processed by the labeling, to obtain the second model.

The second neural network is built based on dilated convolution and attention model.

Figure 7:
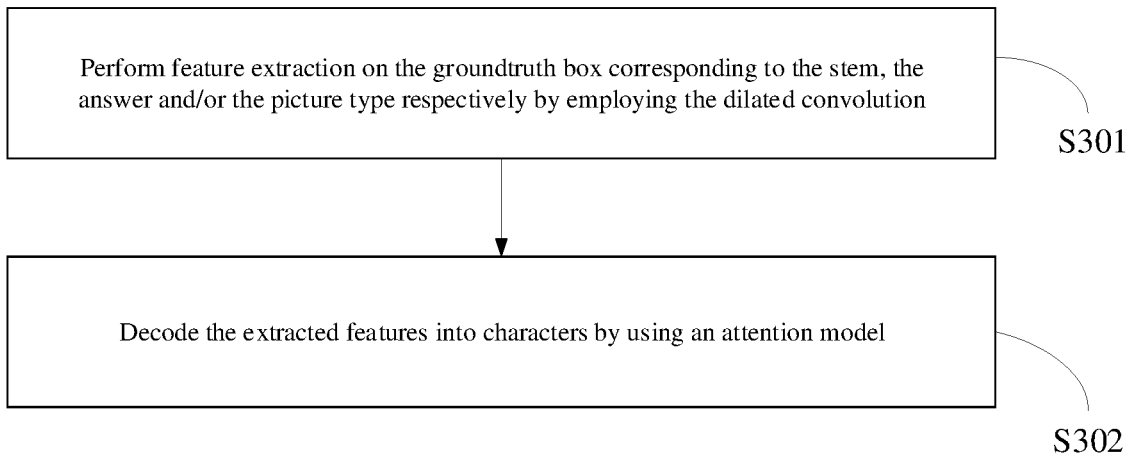
FIG. 7 shows a refined flow chart of Step 3 in the intelligent identification of the present invention.

The refined processing of step S3 is as shown in FIG. 7. Referring to FIG. 7, the following is a detailed description of the specific processing process of step S3.

Step S301: performing feature extraction on the groundtruth box corresponding to the stem, the answer and/or the picture type respectively by employing the dilated convolution.

The extracted features have a larger receptive field, and the identification can be done according to the context of the handwriting text by employing the dilated convolution, and the identification can be done at intervals, without being identified literally, facilitating parallel processing by a machine.

Step S302: decoding the extracted features into characters by using an attention model.

Figure 2:
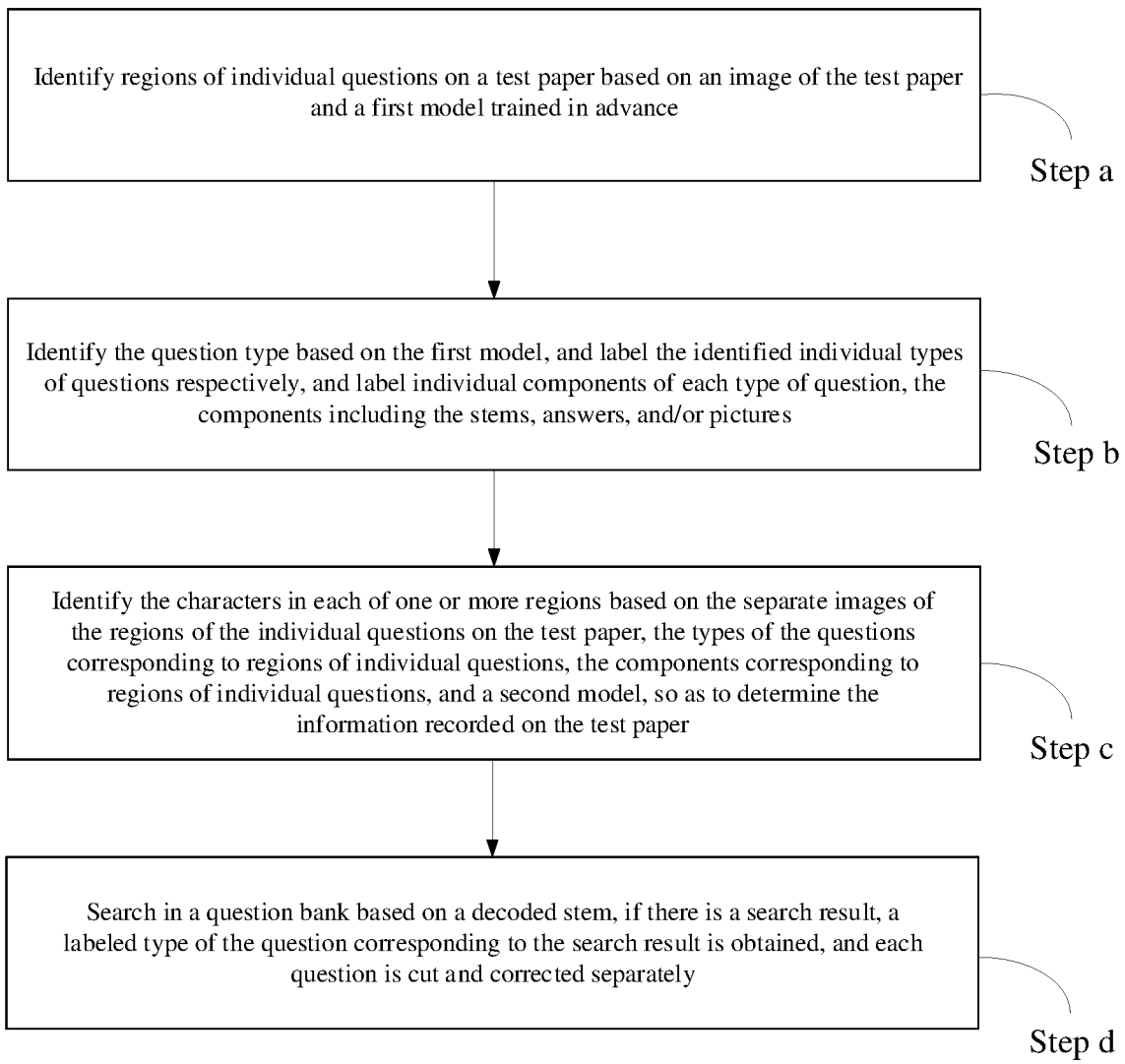
FIG. 2 shows a flow chart of one embodiment of a method for intelligent correction of a question of the present invention.

FIG. 2 shows a flow chart of one embodiment of a method for intelligent correction of a question of the present invention. Referring to FIG. 2, the following is a detailed description of the implementation steps of the method of the present embodiment.

Step a: identifying regions of individual questions on a test paper based on an image of the test paper and a first model trained in advance, wherein the first model is a neural network based model.

Step b: identifying the question type for regions of the individual questions respectively by using the first model, and label the identified individual types of questions respectively, and label individual components of the corresponding type of the question in the region of individual questions, the components including stems, answers, and/or pictures.

Step c: identifying the characters in each of the one or more regions based on the separate images of the regions of the individual questions on the test paper, the types of the questions corresponding to the regions of the individual questions, the components corresponding to the regions of the individual questions, and a second model, so as to determine the information recorded on the test paper, wherein the second model is a neural network based model.

The processing process of above steps a-c are the same as that of steps S1-S3 of the previous described method for intelligent identification of a question, and the refined processing of each step will not be described again.

Step d: searching in a question bank based on a decoded stem, if there is a search result, a labeled type of the question corresponding to the search result is obtained, and each question is cut and corrected separately.

Different types of questions correspond to different correction methods, as follows:

If the question type is a calculation type question, the result is calculated by a calculation engine and comparison is performed. In the correction of the calculation type question, for the calculation question with multiple calculation steps, the answer process of different lines is cut and judged whether the calculation is correct according to the content of up and down lines by the calculation engine. In addition, questions with the filling of calculation symbols, more-than sign and less-than sign, and the unit conversion are identified as the calculation type question, and the correction is done by the calculation engine to judge the content of both sides.

If the question type is a choice or fill-in-the-blank or true or false type question, it is directly decided whether the input answer is consistent with the labeled answer.

If the question type is subjective type question, the standard answer is shown directly.

Figure 12:
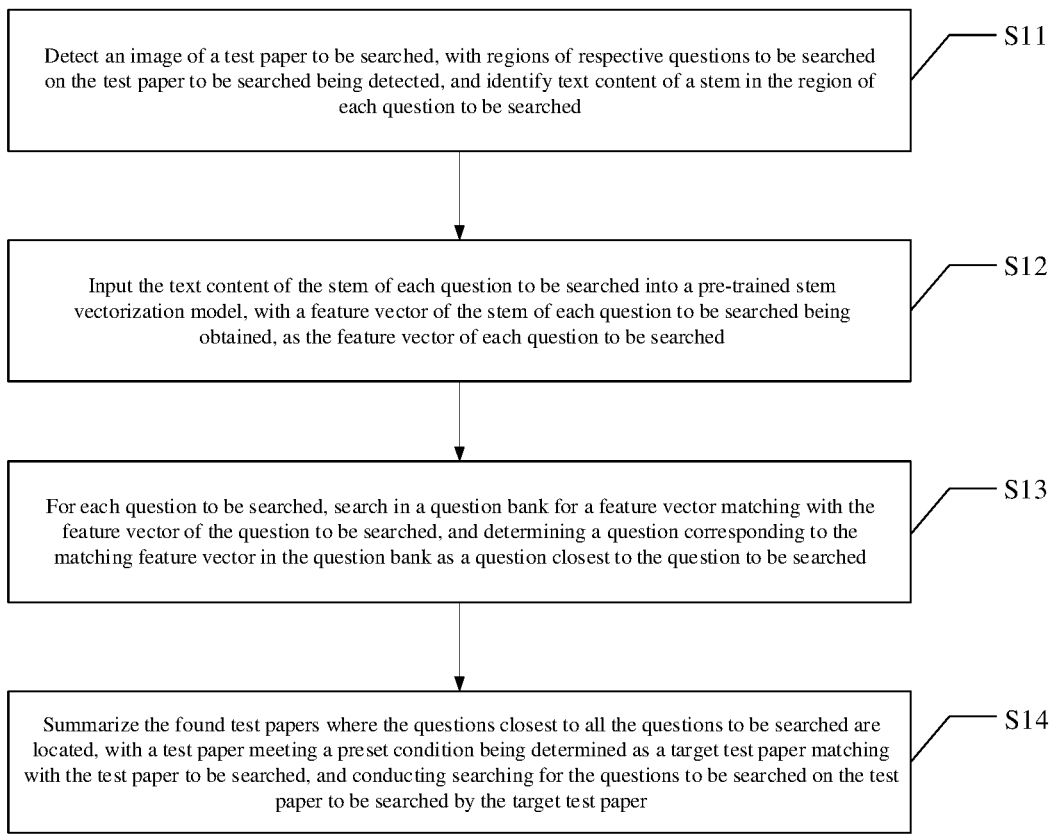
FIG. 12 shows a flow chart of a method for search of questions of the present invention.

FIG. 12 is a schematic flowchart of a method for search of questions according to an embodiment of the present invention. Referring to FIG. 12, the method for search of questions can comprise the following steps:

Step S11: detecting an image of a test paper to be searched, with regions of respective questions to be searched on the test paper to be searched being detected, and identifying text content of a stem in the region of each question to be searched. The process of step S11 can be the same as Steps a to c described above, and therefore will not be described again.

Step S12: inputting the text content of the stem of each question to be searched into a pre-trained stem vectorization model, with a feature vector of the stem of each question to be searched being obtained, as the feature vector of each question to be searched.

Figure 13:
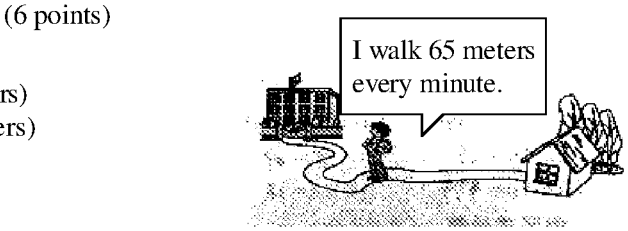
FIG. 13 shows an example of the question to be searched of the present invention.

For example, for a question to be searched as shown in FIG. 13, the text content of the stem of the question is "4. Xiao Ming walks for 3 minutes just to half of the whole journey, how many meters is his home from school? (6 points)". The text content is input into a pre-trained stem vectorization model, for example, a sent2vec model, and the feature vector of the stem is obtained. The feature vector can be expressed as $[x0, x1, x2, \ldots xn]$.

The stem vectorization model can be a neural network based model, such as a CNN model, and the stem vectorization model can be trained by the following steps: performing labeling process on each question sample in a first training set of question samples, with the text content of the stem of each question sample being labeled; extracting the two-dimensional feature vector of the text content of the stem of each question sample by using the neural network model, thus obtaining the stem vectorization model by training. The specific training process belongs to the prior art and will not be described here.

Step S13: for each question to be searched, searching in a question bank for a feature vector matching with the feature vector of the question to be searched, and determining a question corresponding to the matching feature vector in the question bank as a question closest to the question to be searched.

The feature vector matching with the feature vector of the question to be searched can be found in the question bank by means of vector approximation search, and specifically, the feature vector closest to the feature vector of the question to be searched is found in the question bank. It can be understood that "Distance" between vectors is commonly used as the Similarity Measurement between different vectors, the commonly used distance comprises: Euclidean distance, Manhattan distance, and angle cosine (Cosine) and so on. The calculation method adopted in this embodiment is the angle cosine.

A matching threshold can be set for such searches, such that N matching question vectors with matching degree greater than the matching threshold can be found. Since a conversion algorithm (such as the known word2vec conversion model, doc2vec conversion model, etc.) usually sets a lower weight to numbers in the question when converting the question into a two-dimensional feature vector, this results in that the text portions of the more matching questions found are usually matching with the question to be searched, while the number portions may be not that matching. This means the question corresponding to the more matching question vector is basically the same or similar to the text of the question to be searched (which can be understood as of the same type of question), and the numbers to be calculated can be different. Then, the character content identified from the question to be searched is compared with the character content of the stem of the question corresponding to the searched N more matching question vectors (for example, text comparison of some known text comparison tools), and the searched N more matching question vectors are ranked according to the comparison, in order to find the most matching question with the question to be searched.

Preferably, in order to facilitate the searching of the feature vector, an index information table can be established in advance for the feature vectors of respective questions on the test papers in the question bank. The index information table can store the feature vectors of respective questions in the question bank, the specific content of the questions, and the ID of the test paper where the question is located.

Accordingly, step S13 can further comprise: for each question to be searched, searching in the index information table a feature vector matching with the feature vector of the question to be searched; determining a question corresponding to the matching feature vector in the index information table as a question closest to the question to be searched.

It can be understood that after finding the matching feature vector in the index information table, the closest question is found in the index information table. Then, the specific content of the closest question can be obtained (including the stem of the question, the answer, and/or picture), as well as the ID information of the test paper where the closest question is located.

Preferably, before the index information table is established, the feature vectors of different lengths can be grouped by length. In this way, when searching the feature vector matching with the feature vector of the question to be searched in the index information table, a group having the same or similar length as the feature vector of the question to be searched can first be located in the index information table, and the feature vector matching with the feature vector of the question to be searched is found in the group of the same or similar length as the feature vector of the question to be searched in the index information table. In the case of grouping, the feature vectors of the same length can be grouped into one group, or the feature vectors of lengths within a certain range can be grouped into one group, which is not limited by the present invention. It can be seen that by grouping the feature vectors of different lengths by length, when later searching questions, the speed for searching questions can be improved by querying in the respective groups according to length of the feature vector. It can be understood that difference in the length of the feature vector is due to difference in the number of characters in the stem.

Step S14: summarizing the found test papers where the questions closest to all the questions to be searched are located, with a test paper meeting a preset condition being determined as a target test paper matching with the test paper to be searched, and conducting searching for the questions to be searched on the test paper to be searched by the target test paper.

In particular, determining the test paper meeting the preset condition as the target test paper matching with the test paper to be searched can comprise: determining a test paper that occurs with a frequency equal to or above a first preset threshold as the target test paper matching with the test paper to be searched. In actual processing, each question in the question bank has corresponding test paper ID information and position information in the current test paper. Therefore, it can be determined which test paper the closest question belongs to according to the test paper ID of the closest question, the ID of the test paper that occurs with a frequency equal to or above the first preset threshold can further be determined, the test paper ID is determined as the matching target test paper. The frequency of occurrence of a test paper can be calculated in the following manner: a ratio between the number of the closest questions in the test paper and the total number of questions to be searched in the test paper to be searched, or a ratio between the number of questions in the test paper matching with the questions to be searched in the test paper to be searched and the total number of questions to be searched in the test paper to be searched. It can be understood that if the frequency of occurrence of the test paper with the highest frequency of occurrence is less than a first preset threshold, which indicates the number of matching questions in the test paper with the highest frequency of occurrence and the test paper to be searched is too few, it can be considered that there is no test paper matching with the test paper to be searched in the question bank.

In particular, the questions to be searched on the test paper to be searched are searched by the target test paper, comprising: on one hand, when the closest question to a question to be searched in the test paper to be searched belongs to the target test paper, the closest question to the question to be searched can directly be determined as the search result of the question to be searched; on the other hand, when the closest question to a question to be searched in the test paper to be searched does not belong to the target test paper, the feature vector of the question to be searched can be matched with the feature vector of each question in the target test paper for the minimum edit distance, and the question with the minimum edit distance in the target test paper is found as the target question. If the smallest minimum edit distance is less than a second preset threshold, then the search result of the question to be searched is corrected to the target question. For example, after the target test paper is determined, if the closest question to a question A in the test paper to be searched as determined in step S13 does not belong to the target test paper, all the questions in the target test paper are matched with question A for the minimum edit distance, finding a question B with the minimum edit distance which is the smallest. If the minimum edit distance is less than a preset threshold, the search result of the question A is corrected to the question B; otherwise, there is no legal search results for the question A. The algorithm for performing the minimum edit distance matching on the feature vector belongs to a conventional calculation method in the field, and thus is not described herein.

In an implementation manner, for example, there is only one or several questions to be searched in the test paper to be searched, the same test paper cannot be found in the question bank, but the corresponding question can be found. In this case, for each question to be searched, the closest question can be queried in the question bank, and then it can be determined whether the minimum edit distance between the question to be searched and the closest question is less than the second preset threshold. If yes, the closest question is the search result of the question to be searched.

It can be understood by those skilled in the art that there are often questions containing pictures in the test paper to be searched, as shown in FIG. 13. Since the picture is an important part of the question, the search can be conducted by combining the stem and the picture when searching for the question, further improving the accuracy for search of questions.

Figure 15:
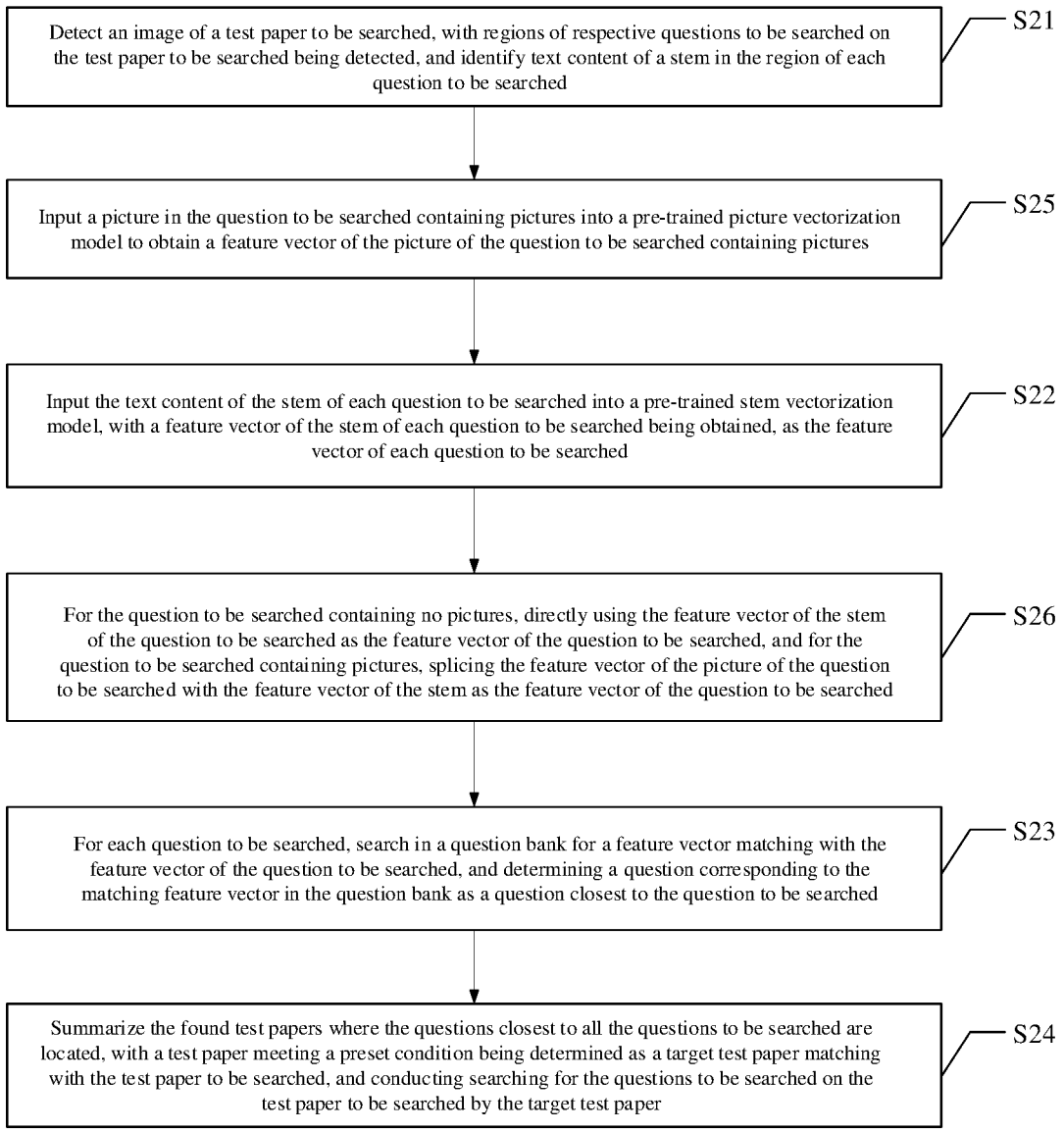
FIG. 15 shows a flow chart of another method for search of questions of the present invention.

In view of this, another embodiment of the present invention provides a method for search of questions by combining the stem and pictures, in order to improve the search speed and accuracy. FIG. 15 is a schematic flowchart of a method for search of questions according to another embodiment of the present invention, comprising the following steps:

Step S21: detecting an image of a test paper to be searched, with regions of respective questions to be searched on the test paper to be searched being detected, and identifying text content of a stem in the region of each question to be searched;

Step S25: inputting a picture in the question to be searched containing pictures into a pre-trained picture vectorization model to obtain a feature vector of the picture of the question to be searched containing pictures;

Step S22: inputting the text content of the stem of each question to be searched into a pre-trained stem vectorization model, with the feature vector of each question to be searched being obtained;

Step S26: for the question to be searched containing no pictures, directly using the feature vector of the stem of the question to be searched as the feature vector of the question to be searched, and for the question to be searched containing pictures, splicing the feature vector of the picture of the question to be searched with the feature vector of the stem as the feature vector of the question to be searched;

Step S23: for each question to be searched, searching in a question bank for a feature vector matching with the feature vector of the question to be searched, and determining a question corresponding to the matching feature vector in the question bank as a question closest to the question to be searched;

Step S24: summarizing the found test papers where the questions closest to all the questions to be searched are located, with a test paper meeting a preset condition being determined as a target test paper matching with the test paper to be searched, and conducting searching for the questions to be searched on the test paper to be searched by the target test paper.

In an embodiment, the picture vectorization model in Step S25 can be a neural network based model, such as a CNN model, and the picture vectorization model can be obtained by the following steps: performing on each question sample in a second training set of question samples labeling process, with the picture in each question sample being labeled; extracting two-dimensional feature vector from the picture in each question sample by using a neural network model, thus obtaining the picture vectorization model by training. The second training set of question samples can be the same as the first training set of question samples, or not, which is not limited by the embodiment of the present invention. In addition, the specific training process belongs to the prior art, and will not be described herein.

Figure 14:
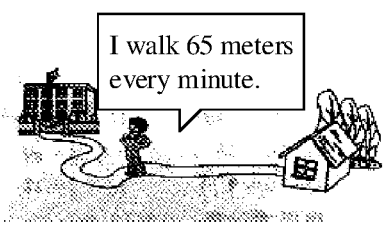
FIG. 14 shows a picture in the question to be searched as shown in FIG. 13.

In step S25, the picture in the question to be searched containing pictures is input into the pre-trained picture vectorization model, to obtain a feature vector of the picture of the question to be searched containing pictures. Taking the question to be searched in FIG. 13 as an example, the picture in the question is shown in FIG. 14. The picture shown in FIG. 14 is input into the pre-trained picture vectorization model, for example, the image2vec model, to obtain the feature vector of the picture, and the feature vector can be expressed as [y0, y1, y2, . . . yn].

In step S26, for the questions to be searched containing pictures, the feature vector of the picture of the question to be searched and the feature vector of the stem are spliced to obtain the feature vector of the question to be searched. Taking again the question shown in FIG. 13 as an example, the feature vector of the question to be searched obtained after splicing is [x0, x1, xn, y0, y1, yn].

It should be noted that when two or more pictures are contained in a question to be searched, each picture is input into a picture vectorization model to obtain a feature vector of each picture, and then the feature vectors of each picture are sequentially spliced together with the feature vector of the stem. Since the numbers of pictures and the numbers of characters of the stems of different questions are different, the lengths of the feature vectors of the questions are also different.

In addition, steps S21-S24 are similar to steps S11-S14 in FIG. 12, and thus not described herein. The order of the steps S25 and S22 is not limited in the embodiment of the present invention.

In view of the above question search method, the present invention further provides a method for intelligent correction of questions, comprising the following two steps:

Step S1*a*, searching for a question to be corrected by using any of above methods for searching questions, with a target question in the question bank matching with the question to be corrected being searched;

Step S2*a*, for the question to be corrected, correcting the question to be corrected according to the answer to the question in the question bank matching with the question to be corrected.

In view of the above question search method, the present invention further provides another method for intelligent correction of questions, comprising the following two steps:

Step S1*b*, searching for a test paper to be corrected by using any of above methods for searching questions, with a target test paper in the question bank matching with the test paper to be corrected being searched;

Step S2*b*: for each question to be corrected in the test paper to be corrected, correcting the question to be corrected according to the answer to the question on the target test paper matching with the question to be corrected.

In an embodiment of the present invention, after the target question matching with the question to be corrected is found in the question bank, questions to be corrected are cut and separately corrected. For each question A to be corrected, if the corresponding search result in the question bank is a question B, the labeled type of the question B is obtained, and the question A is corrected according to the answer to the question B. In the embodiment of the present invention, after the target test paper matching with the test paper to be corrected is found in the question bank, questions to be corrected are cut and separately corrected. For each question A to be corrected, if the corresponding search result in the target test paper is a question B, the labeled type of the question B is obtained, and the question A is corrected according to the answer to the question B. In particular, if the type of question is calculation, it is handed over to the calculation engine for execution. For a question with multiple calculation steps, different rows of the answer process will be cut and are judged by the calculation engine whether the calculation is correct according to the content of the up and down lines. Questions filled with calculation signs, the sign of greater than or less than, and unit conversion is recognized as the calculation type, contents at two sides are judged by the calculation engine to make correction. For a question of the choice type or true or false type: directly determine whether the answer to the question to be searched is consistent with the answer labeled in the question bank. For a question of other types, directly display the standard answer.

In an embodiment, one or more candidate questions can be searched in the question bank, where the distance between a feature vector of each candidate question and a feature vector of a first question is not greater than a set threshold. Then, the first question is matched with each of the one or more candidate questions, and the one or more candidate questions are sorted and displayed according to the degree of matching from high to low, to obtain one or more questions similar to the first questions. The problem solving process and the answer to the one or more similar questions can be displayed, wherein the problem solving process and the answer to the one or more similar questions are from the question bank.

FIG. 11 shows one example of the contents of a test paper of the present invention, which includes various types of questions: fill-in-the-blank type questions, calculation type questions, choice type questions, application type questions, and the like. Each type of question includes the stem with printed font and the content of the answer with handwriting font written by the student. Some graphic type questions also have printed graphics and so on.

With the above method of the present invention, regions of corresponding positions of individual questions are first identified, and then the types corresponding to the individual questions and the components such as stem, answers, graphics, and the like in each type are identified. Finally, the font information of the printed font in the stem and the handwriting font in the answer are identified respectively. After all the character information in the test paper is identified, the automatic correction can be done based on a database and a calculation engine.

Figure 9:
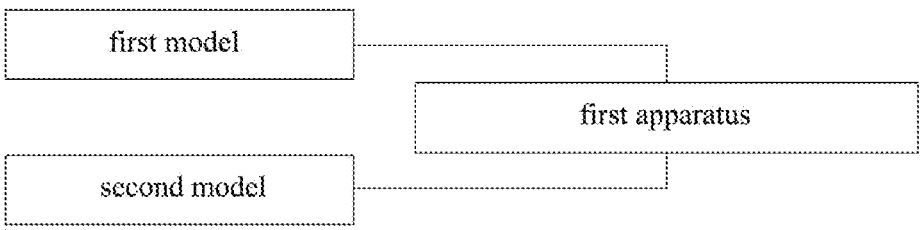
FIG. 9 shows a schematic diagram of one embodiment of a system for intelligent identification of a question of the present invention.

FIG. 9 shows a schematic diagram of one embodiment of a system for intelligent identification of a question of the present invention. Referring to FIG. 9, the system of this embodiment comprises: a first model, a second model, and a first apparatus.

The first model is a neural network based model that is trained by a deep convolutional neural network as shown in FIG. 3. The second model is trained by a dilated convolution and attention model as shown in FIG. 4. The specific training process (including the testing process) has been described in detail in the foregoing embodiments, and details are not described herein again.

The second model can adopt the same neural network-based model, and can also include a recognition model for the stem and a recognition model for the answer, wherein, the stem is composed of printed fonts, and the answer is composed of handwriting fonts, so for more accurate identification, the recognition model for the stem and the recognition model for the answer are trained independently.

The first apparatus is configured to implement the following functions:

identify regions of individual questions on a test paper based on an image of the test paper and a first model trained in advance;

identify the question type for regions of the individual questions respectively by using the first model, and label the identified individual types of questions respectively, and label individual components of the corresponding type of the question in the region of individual questions, the components including stems, answers, and/or pictures;

identify characters in each of the one or more regions based on the separate images of the regions of the individual questions on the test paper, the type of the question corresponding to the region of the question, the component corresponding to the region of the question, and a second model, so as to determine the information recorded on the test paper.

Figure 10:
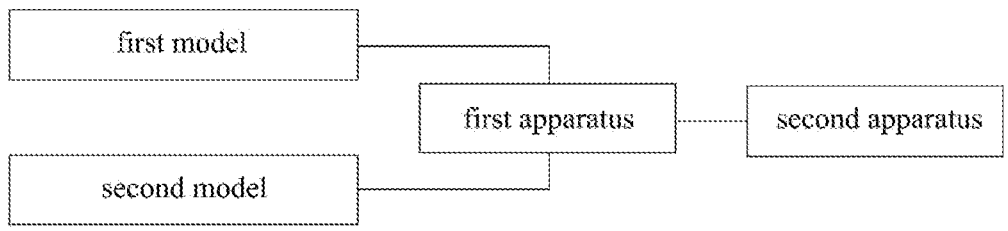
FIG. 10 shows a schematic diagram of one embodiment of a system for intelligent correction system of a question of the present invention.

FIG. 10 shows a schematic diagram of one embodiment of a system for intelligent correction system of a question of the present invention. Referring to FIG. 10, the system of this embodiment comprises: a first model, a second model, a first apparatus, and a second apparatus.

The first model, the second model and the first apparatus constitute the system for intelligent identification of a question as shown above in FIG. 9, and the specific functions thereof are not described again. While the second apparatus is configured to implement the following functions: searching in a question bank based on a decoded stem, if there is a search result, a labeled type of the question corresponding to the search result is obtained, and each question is cut and corrected separately.

The second apparatus performs correction for different types of questions:

If the question type is a calculation type question, the result is calculated by a calculation engine and comparison is performed;

If the question type is a choice or fill-in-the-blank or true or false type question, it is directly decided whether the input answer is consistent with the labeled answer;

If the question type is subjective type question, the standard answer is shown directly.

And in the correction of the calculation type question, for the calculation question with multiple calculation steps, the answer process of different lines is cut and judged whether the calculation is correct according to the content of up and down lines by the calculation engine. In addition, question with the filling of calculation symbols, more-than sign and less-than sign, and the unit conversion are identified as the calculation type question, and the correction is done by the calculation engine to judge the content of both sides.

Figure 16:
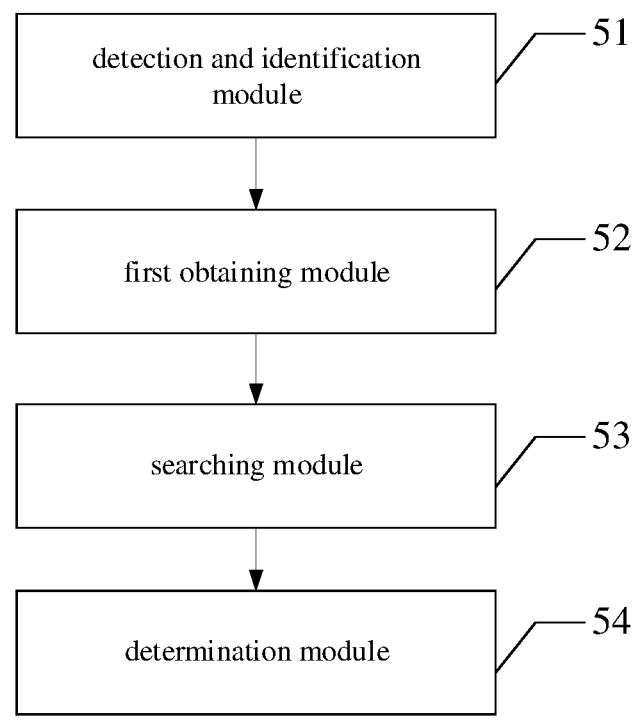
FIG. 16 shows a schematic diagram of an apparatus for search of questions of the present invention.

Corresponding to the above embodiment of the method for search of questions, the present invention provides an apparatus for search of questions, with reference to FIG. 16. The apparatus comprises:

a detection and identification module 51, configured to detect an image of a test paper to be searched, with regions of each question to be searched on the test paper to be searched being detected, and identify text content of a stem in the region of each question to be searched;

a first obtaining module 52, configured to input the text content of the stem of each question to be searched into a pre-trained stem vectorization model, with a feature vector of the stem of each question to be searched being obtained, as the feature vector of each question to be searched, wherein the stem vectorization model is a neural network based model;

a searching module 53, configured to, for each question to be searched, search in a question bank for a feature vector matching with the feature vector of the question to be searched, and determine a question corresponding to the matching feature vector in the question bank as a question closest to the question to be searched;

a determination module 54, configured to summarize and find test papers where the questions closest to all the questions to be searched are in, with a test paper meeting a preset condition being determined as a target test paper matching with the test paper to be searched, and conduct searching for the questions to be searched on the test paper to be searched by the target test paper.

Optionally, the apparatus further comprises:

a first training module, configured to obtain the stem vectorization model by training: performing on each question sample in a first training set of question samples labeling process, with text content of the stem in each question sample being labeled; extracting a two-dimensional feature vector from the text content of the stem in each question sample by using a neural network model, thus obtaining the stem vectorization model by training.

Optionally, if the question to be searched in the test paper to be searched contains a picture, the apparatus further comprises:

a second obtaining module, configured to, after detecting the region of each question to be searched on the test paper to be searched in the detection and identification module, input the picture in the question to be searched containing the picture into a pre-trained picture vectorization model to obtain a feature vector of the picture of the question to be searched containing the picture, wherein the picture vectorization model is a neural network based model;

a third obtaining module, configured to, for the question to be searched containing no pictures, directly use the feature vector of the stem of the question to be searched as the feature vector of the question to be searched, and for the question to be searched containing pictures, splicing the feature vector of the picture of the question to be searched with the feature vector of the stem as the feature vector of the question to be searched.

Optionally, the apparatus further comprises:

a second training module, configured to obtain the image vectorization model by training: performing on each question sample in a second training set of question samples labeling process, with the picture in each question sample being labeled; extracting two-dimensional feature vector from the picture in each question sample by using a neural network model, thus obtaining the picture vectorization model by training.

Optionally, the apparatus further comprises:

a pre-processing module, configured to establish an index information table in advance for the feature vectors of each question on the test papers in a question bank;

the searching module 53, specifically configured to, for each question to be searched, search in the index information table a feature vector matching with the feature vector of the question to be searched; determine a question corresponding to the matching feature vector in the index information table as a question closest to the question to be searched.

Optionally, the pre-processing module is further configured to group feature vectors of different lengths by length before the index information table is established;

The searching module 53 is specifically configured to, for each question to be searched, within a group of the index information table that has a same or similar length as the feature vector of the question to be searched, search for a feature vector matching with the feature vector of the question to be searched.

Optionally, the determination module 54 is specifically configured to determine a test paper that occurs with a frequency equal to or above a first preset threshold as the target test paper matching with the test paper to be searched.

Optionally, the determination module 54 is specifically configured to: when a question closest to a certain question to be searched in the test paper to be searched belongs to the target test paper, determine the question closest to the certain question to be searched as search result of the certain question to be searched; when a question closest to a certain question to be searched in the test paper to be searched does not belong to the target test paper, match the feature vector of the certain question to be searched with the feature vector of each question in the target test paper for a minimum edit distance, finding a question with a minimum edit distance that is smallest in the target test paper as the target question, and if the minimum edit distance that is smallest is less than a second preset threshold, correct the search result of the certain question to be searched as the target question.

Optionally, the detection and identification module 51 is specifically configured to detect the image of the test paper to be searched by using a pre-trained detection model, with regions of each question to be searched on the test paper to be searched being detected, wherein the detection model is a neural network-based model.

Optionally, the detection and identification module 51 is specifically configured to identify the text content of the stem in the region of each question to be searched by using a pre-trained recognition model, wherein the recognition model is a neural network based model.

Corresponding to the above embodiment of the method for intelligent correction of test papers, the present invention provides an apparatus for intelligent correction of test papers. The apparatus comprises an apparatus for search of questions in FIG. 16, and a correction module.

In an embodiment, the apparatus for search of questions is configured to search for a test paper to be corrected, with a target test paper in the question bank matching with the test paper to be corrected being searched;

the correction module is configured to, for each question to be corrected in the test paper to be corrected, correct the question to be corrected according to the answer to the question on the target test paper matching with the question to be corrected.

In addition, the system for intelligent identification of a question disclosed in the present invention comprises a processor, a memory for storing a series of computer executable instructions and computer accessible data associated with the series of computer executable instructions, which when executed by the processor, cause the processor to perform the method of the embodiment shown in FIG. 1 above.

The non-transitory computer readable storage medium disclosed in the present invention has stored thereon a series of computer executable instructions, which when executed by a computing apparatus, cause the computing apparatus to perform the method of the embodiment shown in FIG. 1 above.

The system for intelligent correction of a question disclosed in the present invention comprises a processor and a memory for storing a series of computer executable instructions and computer accessible data associated with the series of computer executable instructions, which when executed by the processor, cause the processor to perform the method of the embodiment shown in FIG. 2 above.

The non-transitory computer readable storage medium disclosed in the present invention has stored thereon a series of computer executable instructions, which when executed by a computing apparatus, cause the computing apparatus to perform the method of the embodiment shown in FIG. 2 above.

In addition, the system for intelligent identification of a question disclosed in the present invention comprises a processor, a memory for storing a series of computer executable instructions and computer accessible data associated with the series of computer executable instructions, which when executed by the processor, cause the processor to perform the method of the embodiment shown in FIG. 12 above.

The non-transitory computer readable storage medium disclosed in the present invention has stored thereon a series of computer executable instructions, which when executed by a computing apparatus, cause the computing apparatus to perform the method of the embodiment shown in FIG. 12 above.

The system for intelligent correction of a question disclosed in the present invention comprises a processor and a memory for storing a series of computer executable instructions and computer accessible data associated with the series of computer executable instructions, which when executed by the processor, cause the processor to perform the method of the embodiment shown in FIG. 15 above.

The non-transitory computer readable storage medium disclosed in the present invention has stored thereon a series of computer executable instructions, which when executed by a computing apparatus, cause the computing apparatus to perform the method of the embodiment shown in FIG. 15 above.

Although the above methods are illustrated and described as a series of acts for simplicity of the explanation, it should be understood and appreciated that these methods are not limited by the order of the acts, as in accordance with one or more embodiments, some acts may occur in different orders and/or concurrently with other acts that are illustrated and described herein or that are not illustrated and described herein, but are understood by those skilled in the art.

Those skilled in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps are described above generally in the form of their functionality. Whether such functionality is implemented as hardware or software depends on the particular application and design constraints imposed on the overall system. The skilled person will be able to implement the described functionality in a different manner for each particular application, but such implementation decisions should not be interpreted as causing a departure from the scope of the invention.

Various illustrative logic blocks, modules, and circuits described in connection with the embodiments disclosed herein may be implemented or executed in general purpose processors, digital signal processors (DSPs), application specific integrated circuits (ASICs), field programmable gate arrays (FPGAs) or other programmable logic devices, discrete gate or transistor logic, discrete hardware components, or any combination thereof designed to perform the functions described herein. The general purpose processor may be a microprocessor, but in the alternative, the processor may be any conventional processor, controller, microcontroller, or state machine. The processor may also be implemented as a combination of computing devices, such as a combination of a DSP and a microprocessor, a plurality of microprocessors, one or more microprocessors in conjunction with a DSP core, or any other such configurations.

The steps of a method or algorithm described in connection with the embodiments disclosed herein may be embodied in hardware directly, in a software module executed by a processor, or in a combination of the two. A software module may reside in a RAM memory, a flash memory, a ROM memory, an EPROM memory, an EEPROM memory, registers, a hard disk, a removable disk, a CD-ROM, or any other form of storage medium known in the art. An exemplary storage medium is coupled to the processor to enable the processor to read and write information to/from the storage medium. In the alternative, the storage medium can be integrated into the processor. The processor and the storage medium can reside in an ASIC. The ASIC can reside in the user terminal. In the alternative, the processor and the storage medium may reside in a user terminal as discrete components.

In one or more exemplary embodiments, the functions described may be implemented in hardware, software, firmware, or any combination thereof. If implemented as a computer program product in software, the functions may be stored on or transmitted via a computer readable medium, as one or more instructions or code. Computer readable media includes both computer storage media and communication media including any medium that facilitates transfer of a computer program from one place to another. A storage medium may be any available media that can be accessed by a computer. By way of example and not limitation, such computer readable media may comprise RAM, ROM, EEPROM, CD-ROM or other optical disk storage, magnetic disk storage or other magnetic storage device, or any other medium that can be used to carry or store suitable program code in the form of instructions or data structures and that can be accessible to a computer. Any connection is also properly referred to as a computer readable medium. For example, if the software is transmitted from a web site, server, or other remote source using a coaxial cable, a fiber optic cable, a twisted pair, a digital subscriber line (DSL), or a wireless technology such as infrared, radio, and microwave, the coaxial cable, the fiber optic cable, the twisted pair cable, the DSL, or the wireless technology such as infrared, radio, and microwave are included in the definition of the medium. Disks and discs as used herein include compact discs (CDs), laser discs, optical discs, digital versatile discs (DVDs), floppy disks, and Blu-ray discs, in which disks are often reproduced data magnetically, and discs are often reproduced data optically with a laser. Combinations of the above should also be included within the scope of computer readable media.

The previous description of the disclosure is provided to enable any person skilled in the art to make or use the disclosure. Various modifications to the present disclosure will be obvious to those skilled in the art, and the general principles defined herein may be applied to other variations without departing from the spirit or scope of the disclosure. Thus, the present disclosure is not intended to be limited to the examples and designs described herein, but rather should be given the broadest scope in consistent with the principles and novel features disclosed herein.

The invention claimed is:

1. A method for intelligent identification of individual questions, comprising:
   Step 1: identifying, by a processor, respective regions of the individual questions on a test paper based on an image of the test paper and a first model trained in advance, wherein the first model is based on a first neural network;
   Step 2: identifying, by the processor, respective question types for the individual questions in the respective regions by using the first model, and labeling components of the individual questions of the respective identified question types in the respective regions, the components comprising stems, answers, and/or pictures; and
   Step 3: identifying, by the processor, characters in the respective regions of the individual questions based on separate images of the respective regions of the individual questions on the test paper, the respective question types for the individual questions in the respective regions, the components of the individual questions in the respective regions of the individual questions, and a second model, so as to determine information recorded on the test paper, wherein the second model is based on a second neural network, and the second model comprises a first recognition model for the stems and a second recognition model for the answers, wherein each of the stems is composed of a printed font, and each of the answers is composed of a handwriting font, and wherein the first recognition model and the second recognition model are independently trained,
   wherein the first model is obtained from training by: performing a first labeling processing on each test paper image sample in a first training set of test paper image samples to label each of one or more regions in each test paper image sample, a type of a question sample corresponding to each region, components comprised in the question sample corresponding to each region; and training the first neural network with the first training set of test paper image samples, to obtain the first model, wherein the first neural network is built based on a deep convolutional neural network,
   wherein the second model is obtained from training by: performing a second labeling processing on each test paper image sample in a second training set of test paper image samples to label each of one or more regions in each test paper image sample and characters in each region; and training the second neural network with the second training set of test paper image samples, to obtain the second model, wherein the second neural network is built based on a dilated convolution and an attention model,
   wherein, for a first question of the individual questions, Step 3 further comprises: performing feature extraction on groundtruth boxes corresponding to a first stem, a first answer and/or a first picture of the first question by employing the dilated convolution, and decoding an extracted feature into characters by using the attention model.

2. The method according to claim 1, wherein Step 1 further comprises:
   extracting a two-dimensional feature vector from the image of the test paper by using the first model; and
   generating anchors of different shapes in each mesh of the two-dimensional feature vector, and labeling the identified respective regions using groundtruth boxes.

3. The method according to claim 2, wherein after labeling the identified respective regions using the groundtruth boxes, Step 1 further comprises:
   performing regression process on the groundtruth boxes and the generated anchors, so that the groundtruth boxes are close to actual positions of the individual questions.

4. The method according to claim 1, wherein said training the first neural network further comprises:
   obtaining a first accuracy of the trained first neural network based on a test set of test paper image samples;
   if the first accuracy is less than a predetermined threshold, increasing a number of test paper image samples in the first training set of test paper image samples with additional test paper image samples, and each of the additional test paper image samples is subjected to the first labeling processing; and
   re-training the first neural network by using the first training set of test paper image samples with the additional test paper image samples.

5. A method for intelligent identification of individual questions, comprising:
   Step 1: identifying, by a processor, respective regions of the individual questions on a test paper based on an image of the test paper and a first model trained in advance, wherein the first model is based on a first neural network;
   Step 2: identifying, by the processor, respective question types for the individual questions in the respective regions by using the first model, and labeling components of the individual questions of the respective identified question types in the respective regions, the components comprising stems, answers, and/or pictures; and
   Step 3: identifying, by the processor, characters in the respective regions of the individual questions based on separate images of the respective regions of the individual questions on the test paper, the respective question types for the individual questions in the respective regions, the components of the individual questions in the respective regions of the individual questions, and a second model, so as to determine information recorded on the test paper, wherein the second model is based on a second neural network, and the second model comprises a first recognition model for the stems and a second recognition model for the answers, wherein each of the stems is composed of a printed font, and each of the answers is composed of a handwriting font, and wherein the first recognition model and the second recognition model are independently trained,
   wherein the first model is obtained from training by: performing a first labeling processing on each test paper image sample in a first training set of test paper image samples to label each of one or more regions in each test paper image sample, a type of a question sample corresponding to each region, components comprised in the question sample corresponding to each region; and training the first neural network with the first training set of test paper image samples, to obtain the first model, wherein the first neural network is built based on a deep convolutional neural network, wherein the second model is obtained from training by:
performing a second labeling processing on each test paper image sample in a second training set of test paper image samples to label each of one or more regions in each test paper image sample and characters in each region; and training the second neural network with the second training set of test paper image samples, to obtain the second model, wherein the second neural network is built based on a dilated convolution and an attention model, wherein, for a first question of the individual questions, Step 3 further comprises: performing feature extraction on groundtruth boxes corresponding to a first stem, a first answer and/or a first picture of the first question by employing the dilated convolution, and decoding an extracted feature into characters by using the attention model; and for the first question, searching in a question bank with multiple questions on multiple test papers based on an labeled first stem of the first question, and if there is a search result, obtaining a first question type corresponding to the search result, wherein the individual questions are divided and corrected separately.

6. The method according to claim 5, comprising:

if the first question type is a calculation type, calculating a result by a calculation engine and performing a comparison;

if the first question type is a choice type or fill-in-the-blank type or true or false type, directly deciding whether an input answer is consistent with a first answer corresponding to the search result; and if the first question type is a subjective type, showing a standard answer directly.

7. The method according to claim 6, wherein, the first question is of the calculation type and with multiple calculation steps, and the method further comprises dividing an answer process of the first question into different lines and deciding whether the answer process is correct according to contents in up and down lines by the calculation engine.

8. The method according to claim 5, further comprising:

Step 12: inputting text content of the first stem of the first question into a stem vectorization model, and obtaining a first feature vector of the first stem of the first question as a second feature vector of the first question, wherein the stem vectorization model is based on a third neural network; and Step 13: searching in the question bank for a third feature vector matching with the second feature vector of the first question, and determining a second question corresponding to the third feature vector in the question bank as a question closest to the first question.

9. The method according to claim 8, further comprising:

Step 14: summarizing multiple test papers where questions closest to all the individual questions are in, determining a first test paper of the multiple test papers meeting a preset condition as a target test paper matching with the test paper, and conducting searching for the individual questions in the target test paper.

10. The method according to claim 8, wherein the stem vectorization model is trained by:

performing a third labeling processing on each question sample in a first training set of question samples, with text content of a corresponding stem in each question sample being labeled; and extracting a two-dimensional feature vector from the text content of the corresponding stem in each question sample by using the third neural network model, thus obtaining the stem vectorization model by training.

11. The method according to claim 8, wherein, the first question further contains a first picture, and the method further comprises:

Step 15: after identifying the respective regions of the individual questions on the test paper, inputting the picture in the first question into a pre-trained picture vectorization model to obtain a fourth feature vector of the first picture of the first question, wherein the picture vectorization model is based on a fourth neural network; and Step 16: splicing the fourth feature vector of the picture of the first question with the first feature vector of the stem as the second feature vector of the first question.

12. The method according to claim 11, wherein the picture vectorization model is trained by:

performing a fourth labeling processing on each question sample in a second training set of question samples, with a corresponding picture in each question sample being labeled; and extracting a two-dimensional feature vector from the corresponding picture in each question sample by using the fourth neural network model, thus obtaining the picture vectorization model by training.

13. The method according to claim 8, wherein an index information table is established in advance for multiple feature vectors of the multiple questions on the multiple test papers in the question bank; and Step 13 further comprises:
for the first question, searching in the index information table a fifth feature vector matching with the second feature vector of the first question; and
determining a third question corresponding to the fifth feature vector in the index information table as a question closest to the first question.

14. The method according to claim 13, wherein the method further comprises, before the index information table is established, grouping the multiple feature vectors of different lengths by length; wherein said searching in the index information table the fifth feature vector matching with the second feature vector of the first question comprises:

within a group of feature vectors in the index information table that have a same or similar length as the second feature vector of the first question, searching for the fifth feature vector matching with the second feature vector of the first question.

* * * * *